No. 651,285. Patented June 5, 1900.
J. WEST.
METHOD OF MAKING SPECTACLE FRAMES.
(Application filed Aug. 28, 1899.)
(No Model.)
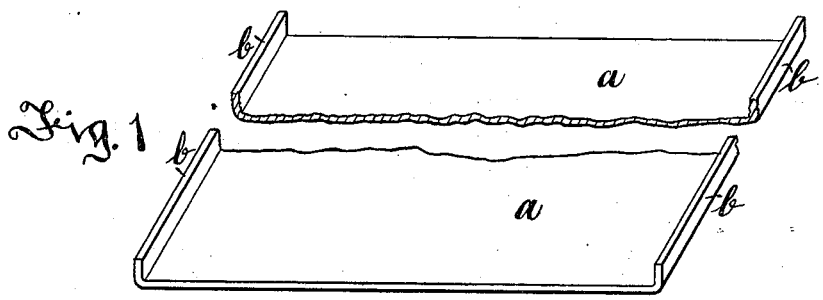
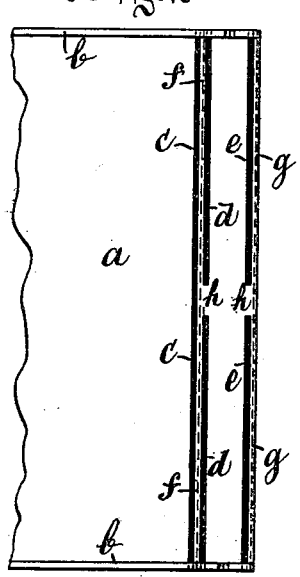
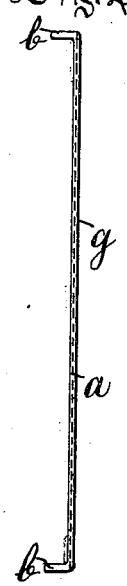
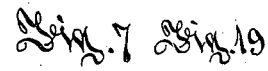
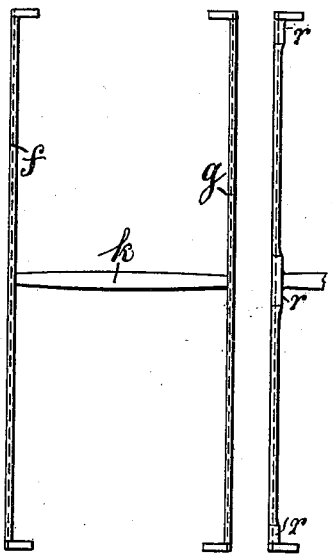
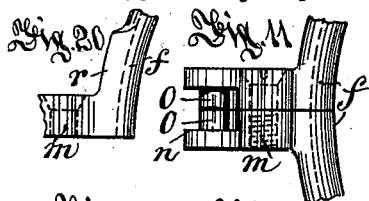
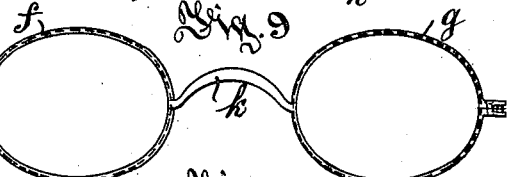
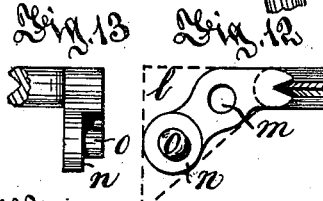
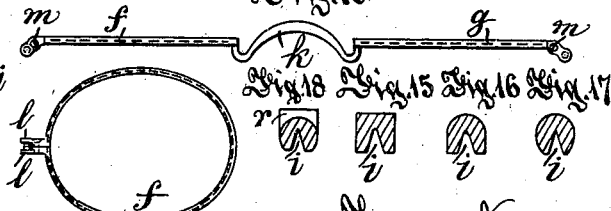

UNITED STATES PATENT OFFICE.

JAMES WEST, OF LONDON, ENGLAND.

METHOD OF MAKING SPECTACLE-FRAMES.

SPECIFICATION forming part of Letters Patent No. 651,285, dated June 5, 1900.

Original application filed May 9, 1899, Serial No. 716,166. Divided and this application filed August 28, 1899. Serial No. 728,739. (No model.)

*To all whom it may concern:*

Be it known that I, JAMES WEST, a subject of the Queen of Great Britain, residing at Stamford Works, Stamford road, Dalston, London, in the county of Middlesex, England, have invented a certain new and useful Improvement in the Frames of Spectacles and Eyeglasses, of which the following is a specification, the same being a division of an earlier application embodying the same subject-matter, filed May 9, 1899, Serial No. 716,166.

My invention relates to improvements in the frames of spectacles and eyeglasses in which magnifying or other lenses are held in light metal frames of suitable shape and having angular grooves in which the edges of the lenses fit, the frames for the two lenses being connected in the case of spectacles by a properly-shaped connecting-bridge or nosepiece and the outer parts of the lens-frames having pivoted to them the sides or "temples" by which the spectacles are held when in use, while in the case of "pince-nez" or single eyeglasses only a single frame for one lens is required.

The objects of my improvement are, first, to make frames of spectacles or pince-nez or single eyeglasses out of a single piece of metal without the aid of brazed joints, such single piece of metal being cut and shaped from a bar of steel or other metal, channel-shaped in cross-section, the lugs which form the fastenings of the frames being formed from the flanges at the edges of the channel-shaped bar; also, to form in such spectacle-frames a groove of V shape instead of the circular groove at present adopted; second, in the frames of spectacles and pince-nez made out of a single piece of metal without the aid of brazed joints by cutting and shaping them from a bar of steel, channel-shaped in cross-section, the strengthening or reinforcing of the frames at the points where the different parts meet. I attain these objects in the manner illustrated in the accompanying drawings, in which—

Figure 1 is a perspective view of a bar of steel of channel-shaped section, out of which spectacle-frames are cut. Fig. 2 is a plan of the same, showing transverse cuts, by which a piece of metal is fashioned and finally cut off from the end of the bar to complete the spectacle-frame. Fig. 3 is a side view of the same. Fig. 4 is an end view of the cut-off piece with fashioning complete. Fig. 5 is a plan of the piece with the surplus part of the metal removed. Fig. 6 is an end view of the same. Fig. 7 shows the same with the central bridge or nosepiece extended and the grooved ribs bent outward. Fig. 8 is an end view of the same. Fig. 9 shows a front view with the parts bent around to form the nosepiece and the frames for the lenses. Fig. 10 is an edge view of Fig. 9. Fig. 11 shows, on a larger scale, the lugs which form the junction of the ends of the lens-frame and the pivots for the side or temple. Fig. 12 shows a side view of the same. Fig. 13 shows an end view, from the outside, of Fig. 12. Fig. 14 shows a single frame for the lens of a pince-nez or of a single eyeglass. Figs. 15, 16, and 17 show, respectively, on an enlarged scale, a section of the rib cut from the bar $a$ and having the V-shaped groove, the same rounded on its upper side, and finally rounded on its lower side. Fig. 18 shows the rib rounded on its lower side only, the upper side being left square. Fig. 19 is a similar bar to that shown in Fig. 7, but showing the frame strengthened or reinforced at the points where the different parts meet. Fig. 20 represents part of the lens-frame and lug shown in Fig. 11, but with the part where they meet strengthened or reinforced.

Similar letters of reference refer to similar parts throughout the several views.

$a$ is a bar of steel or other metal from which the spectacle-frames are to be made. It is of channel shape in cross-section, as shown in Fig. 1, the flat part $a$ serving to produce the eyes or lens-frames and the turned-up flanges $b\ b$ serving to produce ultimately the lugs at each end of the eyes or lens-frames. At a certain distance from the end of the bar $a$, which is firmly held in a vise or press, a piece is cut off of the required width, a transverse cut $c$, Fig. 2, being made through the body of the channel-bar $a$ by means of a circular saw or milling-cutter or by other equivalent means. In Fig. 2 the cut $c$ is shown not extending through the flanges $b\ b$, but only through the body of the bar $a$. A similar parallel cut is made through the bar at *d* and a third at *e*, a narrow transverse rib *f*, rectangular in cross-section, being left between the cuts *c* and *d* and a similar rib *g* between the cut *e* and the outer end of the bar *a*. The two latter cuts are interrupted for a short distance at *h h* at the center of their length, so that the two ribs *f* and *g* remain connected together at the middle of their length.

Completely along the lower side of both the ribs *f* and *g* is made, by a revolving cutter or tool or by hand, a straight V-shaped groove *i* (shown on a greatly-enlarged scale in Figs. 12, 13, 15, 16, and 17) to receive the edges of the lenses, (which are beveled to a less-acute angle, so that they are firmly held in the grooves *i*,) and the upper side of the strips or ribs *f* and *g* is rounded, as shown in Fig. 16, and finally their lower side, as shown in Fig. 17, so that the ribs become circular instead of rectangular in cross-section, as shown. This may be done either before or after the piece of metal which is to form the spectacle-frame is separated from the bar *a* by carrying the slit *c* completely through the flanges *b b*. The piece so cut off then has the whole of the metal cut out between the cuts *d* and *e*, as shown in Fig. 5, with the exception of a curved piece *k* at the center, which connects the ribs *f* and *g* and out of which the nosepiece of the spectacles is eventually formed. The parts of the flanges *b b* to which the ends of the ribs *f* and *g* remain attached are also cut through at their center, leaving a triangular piece *l* upon each end of both ribs, as shown in Figs. 3, 5, 6, and 7. The frame being in the condition shown in Fig. 5, its central part *k* is warmed sufficiently to enable the two sides or ribs *f* and *g* to be separated from each other, the part *k* being stretched out, as shown in Fig. 7. The ends of the connecting-piece *k* are then bent up, as shown in Fig. 8, until the V-shaped grooves along the bottom of the ribs *f* and *g* are directed outward and away from each other, as shown, the triangular pieces *l* at their ends then taking the position shown in Fig. 8. The ribs *f* and *g* are then carefully bent around, so as to form elliptical frames, as shown in Fig. 9, to receive the lenses, the beveled edges of which are held in the grooves *i* inside, which are now inside the frames formed by the ribs *f* and *g*, and the part *k* is bent and shaped to form the nosepiece, as shown in Figs. 9 and 10. When the ribs have been bent around, as shown, the triangular pieces *l* at their ends come face to face, as shown on a large scale in Fig. 11. Before the sides are bent around, however, these triangular pieces *l* are cut to the shape shown in Figs. 10 and 12, forming lugs, through which holes are made to receive the screws *m*, by which they are held together, so as to retain the lenses securely. The outer ends of all the lugs are also reduced to about half their thickness at *n*, Figs. 11, 12, and 13, leaving, however, a central pin standing up for the full thickness of the metal, as shown at *o*, so that when the two lugs are brought together face to face the ends of the pins *o* meet, as shown in Fig. 11, and they form together a pivot upon which the sides or temples of the spectacles, which are of the usual kind, can turn. The reduction of thickness of the lugs, leaving the central pins standing, is easily effected by the flat cutting end of a cylindrical "rose-bit," having a central opening of the same diameter as the pins *o*.

Where a frame for a single eyeglass is to be made, as shown in Fig. 14, a single strip or rib *f* is cut from the channeled bar *a*, having a lug *l* at each end and a V-shaped groove to receive the lens.

In order to strengthen or reinforce the frames at the points where the intersection or junction of the different parts one with the other occurs, I make the part *a* of the bar, Fig. 1, which serves to produce the eyes or lens-frames, somewhat thicker than such frames are required to be when rounded and finished, as shown in Fig. 18, and I make the rounding continuous on only the lower side, that on the upper side not extending for the full length of the rib, but being omitted where the junction with the bridge-piece and with the lugs occurs, as shown at *r* in Figs. 18, 19, and 20.

In Fig. 18 the rib is shown rounded above and below to a somewhat less size than in Fig. 17, the square reinforcement *r* standing above it as the metal is left at its original thickness and may be finished to appear symmetrical in any desired way. In this way the frames are made so that they are strengthened or reinforced by the presence of additional metal at the points where the lugs and the nosepiece join the eye-wires or lens-frames.

I am aware that prior to my invention it has been proposed to make the fronts of spectacle-frames in a single piece by stamping blanks from sheet metal and twisting the ends which are to be bent into the lens-frames so as to form lugs and also to form on the ends studs forming a pivot, through the center of which a screw passes to join them. I therefore do not claim, broadly, such a method of making spectacle-frames; but What I do claim as my invention, and desire to secure by Letters Patent, is—

1. The herein-described method of making spectacle-frames, which consists in providing a flat metallic bar or sheet of proper width for the length of the blanks, with flanges along its side edges; cutting the said bar or sheet transversely through the flat portion thereof, with short interruptions midway the width of the bar, and diagonally through the flanges thereof; forming continuous grooves in the face of the bar or sheet parallel to said cuts, and upon the opposite side of the bar to the direction of the said flanges; forming the nose-bar *k* in flattened V shape; severing the blank from the sheet or bar; extending the nose-bar $k$, and bending and finishing said blank, substantially as described.

2. The herein-described method of making spectacle-frames, which consists in providing a flat metallic bar or sheet of appropriate width for the length of the blanks, with flanges along its side edges; making for each frame two parallel cuts transversely through said bar or sheet, and interrupted for equal short intervals at the center thereof to form the lens-frames; forming continuous grooves in one face of the bar or sheet adjacent to and parallel with said cuts and on farther sides thereof for the lens-grooves, cutting diagonally through said flanges to the ends of said transverse cuts, to form the uniting-flanges of the lens-frame pieces; forming the nose-bar $k$ in elongated V shape formed integral with the lens-frame pieces at the interruptions of said transverse cuts; severing the blanks thus formed from the bar or sheet; heating the said nose-bar, and then extending the same; and bending and finishing the blank, substantially as described.

3. The herein-described method of making spectacle-frames, which consists in providing a flat metallic bar or sheet of appropriate width for the length of the blanks, with flanges along its side edges; making for each frame two parallel cuts transversely through said bar or sheet and interrupted for equal short distances at the center thereof, to form the lens-frames; forming continuous grooves in one face of the bar or sheet adjacent to and parallel with said cuts and on farther sides thereof, for the lens-grooves; cutting through said flanges from central points on the edges thereof in opposite directions to the ends of said transverse cuts, to form the uniting-flanges of the lens-frames; cutting away the metal between said pieces for the lens-frames in such manner as to leave a flattened elongated V-shaped nose-bar piece united at its ends at the interruptions in said transverse cuts with the lens-frame pieces; severing the blank from the bar; heating the said nose-bar piece, extending the same, and bending and finishing the blank, substantially as described.

In testimony whereof I have hereunto affixed my signature in presence of two witnesses.

JAMES WEST.

Witnesses:
PERCY E. MATTOCKS,
IRENÉS FRANCO. VELHO.